UNITED STATES PATENT OFFICE.

ROBERT A. PHAIR, OF ALLENDALE, NEW JERSEY, ASSIGNOR TO H. KOHNSTAMM & CO., A PARTNERSHIP.

DYE ASSISTANT.

1,372,038.  Specification of Letters Patent.  Patented Mar. 22, 1921.

No Drawing.  Application filed August 10, 1918. Serial No. 249,256.

*To all whom it may concern:*

Be it known that I, ROBERT A. PHAIR, a citizen of the United States, residing in Allendale, New Jersey, have invented certain new and useful Improvements in Dye Assistants, of which the following is a specification.

My invention provides a composition which when added to a dye bath facilitates the passage of the coloring matter onto or into the fabric to be dyed, and has advantages over other compositions used for this purpose in cheapness or in slowing down the rate of absorption of coloring matter by the fabric so as to cause the coloring matter to enter more deeply into the fabric. In the latter respect the advantage is most pronounced in the case of coloring matters which pass very quickly to the fabric and for that reason accumulate on the surface and do not enter deeply into the fabric.

My improved composition is particularly useful in dyeing wool, and is applicable also to the dyeing not only of other textile materials but also to non-textile fabrics.

An example of the composition consists of a dry mixture of sodium silico fluorid, ten parts, and oxalic acid, one part. For commercial reasons it is best marketed dry. For use it will be dissolved in water, forty parts of hot water to one of the composition, and this solution added to the dye bath. The quantity used will vary considerably under different circumstances. In some cases the quantity of the composition used would be about two per cent. of the weight of the material to be dyed. The deeper the dye the more of this composition would be needed.

The principal advantage of the fluorid is to retard the effect, while the oxalic acid accelerates it. By increasing or diminishing the percentage of oxalic acid in the mixture the speed with which it works can be varied to secure the best results for particular dye stuffs. For dyes which naturally go onto the fabric slowly the percentage of oxalic acid may be increased beyond the one part stated above, and for dyes which go on quickly the oxalic acid may be reduced to less than one part. Generally speaking, the limits will be from about three parts of oxalic acid to slightly less than one-half of one part, mixed with ten parts of the fluorid. The effect of the retardation is not only to cause a slower and more complete absorption of color by the fabric but also to make the color more uniform, less streaked or spotted, than is sometimes the case with other materials used.

Instead of the specific ingredients above stated there may be used a variety of equivalents which with slight variations in proportions and in the quantity of water needed for solution will perform the same functions.

As a substitute for the sodium silico fluorid any acid compound of fluorin would produce a similar effect.

As substitutes for the oxalic acid I may use generally any acid or acid salt, preferably a dry acid or salt, which accelerates the taking up of the color by the fabric. For example, citric and tartaric acids may be used, though these are generally more expensive than oxalic acid. Also sodium bisulfate may be used, being cheaper than oxalic acid, but it absorbs water from the atmosphere and would not keep well in dry form, and a composition made up with this ingredient would have to be used promptly.

There are considerable advantages in marketing the mixture dry, but it is possible to handle it in the wet form and it is effective in this form.

Various modifications therefore may be made in the mixture as specifically described and additions thereto without departing from the invention as defined in the following claims.

What I claim is—

1. A dye assistant comprising a dry mixture of sodium silico fluorid ten parts and oxalic acid about one part.

2. A dye assistant comprising a dry mixture of sodium silico fluorid ten parts and oxalic acid from slightly less than one-half of one part to about three parts.

3. A dye assistant comprising a mixture in the proportion of about ten parts to one of sodium silico fluorid and oxalic acid.

4. A dye assistant comprising an acid compound of fluorin mixed with another acid ingredient which accelerates the taking up of the color.

5. A dye assistant comprising an acid compound of fluorin mixed with another acid ingredient which accelerates the taking up of the color, the proportions of the fluorin compound and the other acid ingredient being about ten of the former to from one-half to three of the latter.

6. A dye assistant comprising a mixture of ingredients, one of which is adapted to retard the passage of the dye onto the fabric and another of which is adapted to accelerate such passage, the ingredients being proportioned to effect a comparatively slow passage of the dye.

In witness whereof, I have hereunto signed my name.

ROBERT A. PHAIR.